United States Patent [19]

Nomura et al.

[11] Patent Number: 6,008,957

[45] Date of Patent: Dec. 28, 1999

[54] OPTICAL LENS AND METHOD OF MAKING THE SAME

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/154,749

[22] Filed: Sep. 17, 1998

[30] Foreign Application Priority Data

Sep. 30, 1997 [JP] Japan .................................. 9-267262

[51] Int. Cl.$^6$ ........................................................ G02B 7/02
[52] U.S. Cl. ............................................................ 359/819
[58] Field of Search .................................... 359/819, 811, 359/703, 704; 353/100; 362/455

[56] References Cited

U.S. PATENT DOCUMENTS

5,050,963  9/1991  Murakami ............................... 359/808
5,905,599  5/1999  Nomura et al. ........................ 359/819

*Primary Examiner*—Georgia Epps
*Assistant Examiner*—Ricky Mack
*Attorney, Agent, or Firm*—Leydig, Voit & Mayer, Ltd.

[57] ABSTRACT

A lens includes a center-of-gravity adjusting section in order to prevent the center of gravity of the lens from shifting due to removal of a gate portion formed during molding, thereby providing an optical lens which is easily handled and a method of making the optical lens. An optical lens having a flange at the outer periphery of an optically functioning portion includes a gate-cut section formed by cutting off a part of the flange together with a gate portion, continuously with the flange, and a center-of-axis adjusting section, formed by removing a part of the flange, for positioning the center of gravity in alignment with the optical axis of the optically functioning portion.

13 Claims, 9 Drawing Sheets

OPTICAL LENS AND METHOD OF MAKING THE SAME

BACKGROUND OF THE INVENTION

1. Field of the Invention

The present invention relates to an optical lens used for an optical instrument or the like; and a method of making the optical lens.

2. Related Background Art

Figure 17:
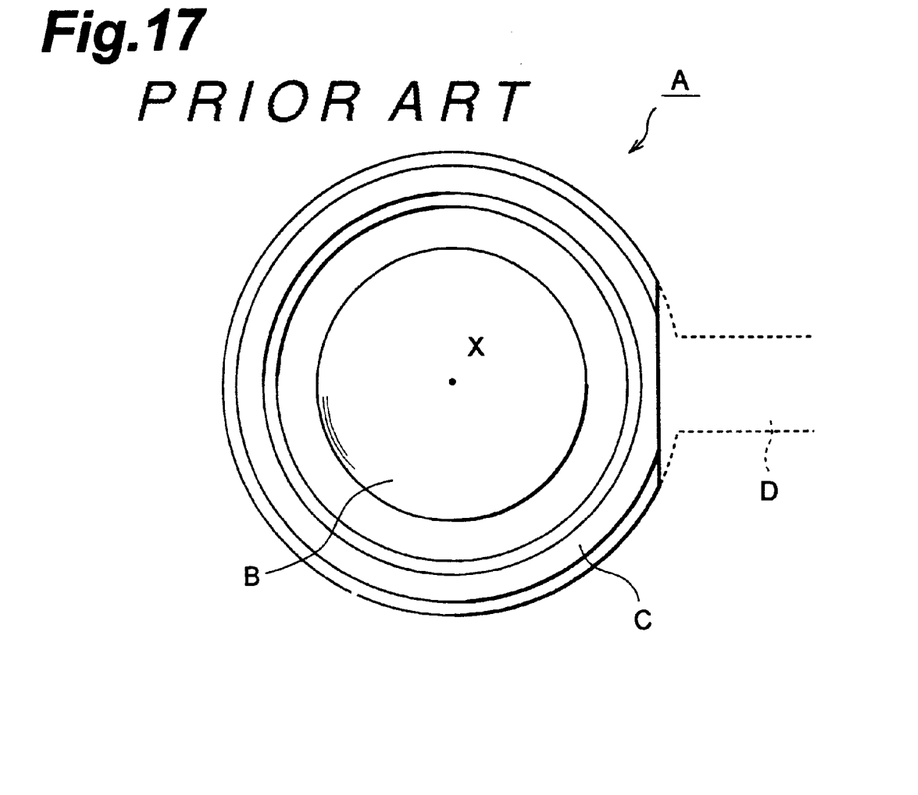
FIG. 17 is an explanatory view of related art.

As shown in FIG. 17, conventionally known is an optical lens A in which a flange C is formed at the outer periphery of an optically functioning portion B. The flange C is used for attaching the optical lens A to a holder or the like. When the optical lens A is manufactured by molding of a resin and the like, a gate, i.e., resin-injecting port, is disposed at the flange C. As a consequence, in the optical lens A immediately after molding, a gate portion D is continuous with the flange C. Then, in order to finish the optical lens A as a product, the gate portion D is cut off. As a method of cutting, a part of the flange C is cut off together with the gate portion D as shown in FIG. 17.

SUMMARY OF THE INVENTION

Figure 18:
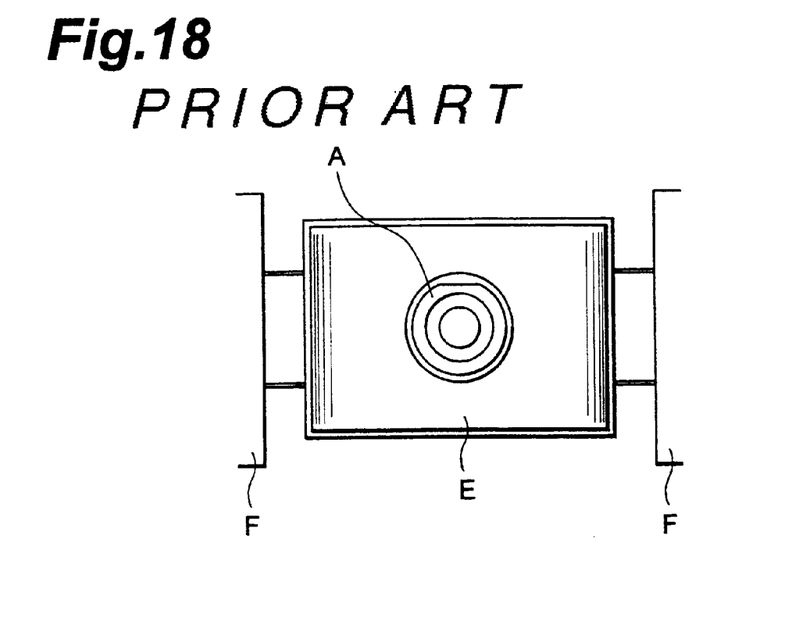
FIG. 18 is an explanatory view of related art.

The above-mentioned optical lens A, however, has the following shortcomings. Namely, as a part of the flange C is cut off together with the gate portion D, the center of gravity of the optical lens A shifts from its optical axis X, thus making it hard to handle the optical lens A. For example, when employed as an objective lens of an optical pickup, the optical lens A is mounted to a movable part E of a lens actuator as shown in FIG. 18. In order to enable high-speed driving, the movable part E is made to have a light weight and is supported by a minute force so as to be capable of adjusting its posture with respect to an actuator main body F. Consequently, in the case where the center of gravity of the optical lens A shifts from the optical axis X located at the lens center, it becomes difficult to acquire horizontal balance of the optical lens A when being mounted to the movable part E, thus making it hard to adjust balance in operation of the movable part E when the actuator is being driven.

In order to overcome the above-mentioned problems, it is an object of the present invention to provide an optical lens and a method of making the same in which the center of gravity of the lens can be positioned substantially on the optical axis while the gate portion is being processed, thus improving its handling characteristic.

In order to achieve such an object, in one aspect, the present invention provides an optical lens in which a flange is formed at an outer periphery of an optically functioning portion, the optical lens comprising a gate-cut section formed by cutting off a part of the flange together with a gate portion continuous with the flange, and a center-of-gravity adjusting section, formed by removing a part of the flange, for positioning a center of gravity of the optical lens onto an optical axis of the optically functioning portion.

In accordance with this aspect of the present invention, as the center-of-gravity adjusting section is provided, the center of gravity of the optical lens can be positioned on its optical axis even when the optical lens has the gate-cut section. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

In another aspect, the optical lens in accordance with the present invention is an optical lens in which a flange is formed at an outer periphery of an optically functioning portion, the optical lens comprising a cutoff section formed by cutting off a gate portion continuous with the flange, and a center-of-gravity adjusting section, formed by removing a part of the flange, for positioning a center of gravity of the optical lens onto an optical axis of the optically functioning portion.

In accordance with this aspect of the present invention, as the center-of-gravity adjusting section is provided, the center of gravity of the optical lens can be positioned on its optical axis even when the optical lens has the cutoff section. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

In still another aspect, the optical lens in accordance with the present invention is an optical lens in which a flange is formed at an outer periphery of an optically functioning portion, the optical lens comprising a cutoff section formed by cutting off a gate portion continuous with the flange, and a center-of-gravity adjusting section, projecting from the flange, for positioning a center of gravity of the optical lens onto an optical axis of the optically functioning portion.

In accordance with this aspect of the present invention, as the center-of-gravity adjusting section is provided, the center of gravity of the optical lens can be positioned on its optical axis even when the optical lens has the cutoff section. As a consequence, horizontal balance is easily acquired when the optical lens is being mounted to a holder or the like. Also, when the optical lens is employed as an objective lens of an optical pickup, balance in operation of an actuator for the objective lens can be easily regulated, thus facilitating its handling.

Also, the present invention provides a method of making an optical lens in which a flange is formed at an outer periphery of an optically functioning portion, the method comprising the steps of molding a lens molded article in which the flange is formed at the outer periphery of the optically functioning portion and a gate portion projects from the flange, and then cutting off a part of the flange together with the gate portion and removing a part of the flange so as to position a center of gravity of the optical lens onto an optical axis of the optically functioning portion.

In another aspect, the present invention provides a method of making an optical lens in which a flange is formed at an outer periphery of an optically functioning portion, the method comprising the steps of molding a lens molded article in which the flange is formed at the outer periphery of the optically functioning portion, a gate portion projects from the flange, and a part of an outer edge of the flange is cut out to form a center-of-axis adjusting section, and then removing a part of the flange together with the gate portion so as to position a center of gravity of the optical lens onto an optical axis of the optically functioning portion.

In accordance with these methods of the present invention, even when a part of the flange is cut off in order to remove the gate portion, the center of gravity of the optical lens can be positioned on its optical axis. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

In still another aspect, the present invention provides a method of making an optical lens in which a flange is formed at an outer periphery of an optically functioning portion, the method comprising the steps of molding a lens molded article in which the flange is formed at the outer periphery of the optically functioning portion and a gate portion projects from the flange, and then cutting off the gate portion so as to leave a part thereof and removing a part of the flange so as to position a center of gravity of the optical lens onto an optical axis of the optically functioning portion.

In a further aspect, the present invention provides a method of making an optical lens in which a flange is formed at an outer periphery of an optically functioning portion, the method comprising the steps of molding a lens molded article in which the flange is formed at the outer periphery of the optically functioning portion, a gate portion projects from the flange, and a part of an outer edge of the flange is cut out to form a center-of-axis adjusting section, and then cutting off the gate portion leaving a part thereof so as to position a center of gravity of the optical lens onto an optical axis of the optically functioning portion.

In accordance with these methods, even when a cutoff section of the gate portion exists in the flange, the center of gravity of the optical lens can be positioned on its optical axis. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

In still another aspect, the present invention provides a method of making an optical lens in which a flange is formed at an outer periphery of an optically functioning portion, the method comprising the steps of molding a lens molded article in which the flange is formed at the outer periphery of the optically functioning portion, a gate portion projects from the flange, and a center-of-axis adjusting section projects from a position symmetrical to the gate portion, and then cutting off the gate portion so as to position a center of gravity of the optical lens onto an optical axis of the optically functioning portion.

In accordance with this method, as the center-of-gravity adjusting section is provided so as to be balanced with the cutout section of the gate portion, the center of gravity of the optical lens can be positioned on its optical axis. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, various embodiments of the present invention will be explained with reference to the accompanying drawings. Among the drawings, constituents identical to each other will be referred to with numerals or letters identical to each other without their overlapping explanations repeated. Also, ratios of sizes in the drawings do not always coincide with those explained.

First Embodiment

Figure 1:
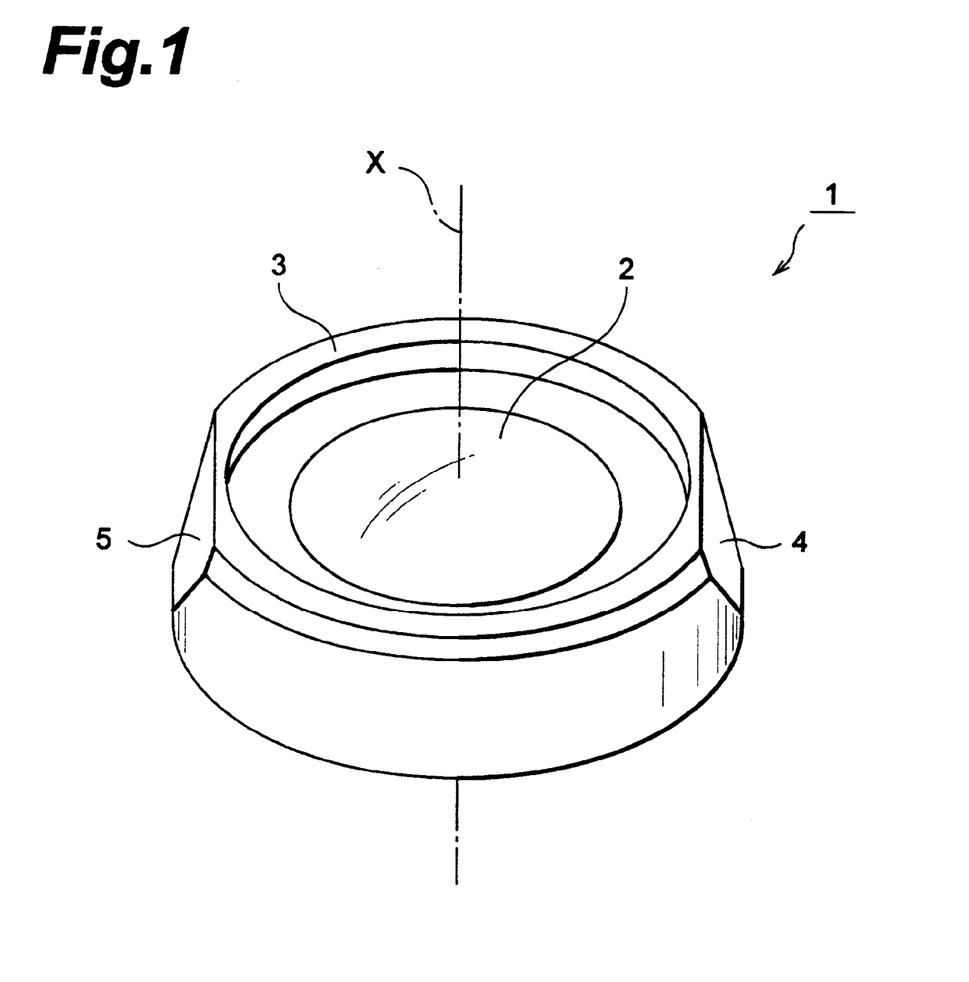
FIG. 1 is a perspective view of an optical lens in accordance with a first embodiment.

FIG. 1 is an explanatory view of an optical lens in accordance with this embodiment. In FIG. 1, an optical lens 1 is constituted by an optically functioning portion 2 and a flange 3 formed at the outer periphery thereof. The optically functioning portion 2, which is a part functioning as an optical lens, is shaped like a disc, for example. The flange 3, which is mainly disposed for attaching the optical lens 1 to a holder or the like, is integrally molded with the optically functioning portion 2 by a resin or the like. Without being restricted to resins, glass or the like may also be used as a material for constituting the optical lens 1. Though the flange 3 has an annular form in the optical lens 1 shown in FIG. 1, the flange 3 should not be restricted to such a form as long as it is formed at the outer periphery of the optically functioning portion 2. For example, it may be formed at a part of the outer periphery of the optically functioning portion 2.

As shown in FIG. 1, a gate-cut section 4 is formed at an outer peripheral portion of the flange 3. The gate-cut section 4 is a cross section formed by removing a part of the outer peripheral portion of the flange 3 together with the gate portion formed upon molding. Preferably, as shown in FIG. 1, the gate-cut section 4 is formed by removing the flange 3 obliquely with respect to the optical axis X. In this case, while leaving the outer shape of the upper end face or lower end face of the flange 3, the gate portion can be separated from the optical lens 1. Accordingly, thus left outer shape can be utilized for mounting the lens.

Also, as shown in FIG. 1, the outer peripheral portion of the flange 3 is formed with a center-of-gravity adjusting section 5. The center-of-gravity adjusting section 5, which is a cross section formed by removing a part of the outer peripheral portion of the flange 3, is disposed at a position symmetrical to the gate-cut section 4 about the optical axis X, for example. Also, the center-of-gravity adjusting section 5 is formed such as to return the center of gravity of the lens, which has shifted from the optical axis X due to the formation of the gate-cut section 4, onto the optical axis X. Therefore, in the case where the center-of-gravity adjusting section 5 is formed at a position symmetrical to the gate-cut section 4 as with the optical lens 1, the part removed upon forming the center-of-gravity adjusting section 5 is made to have the same weight as the part removed upon forming the gate-cut section 4.

A method of making the optical lens 1 will now be explained.

Figure 2:
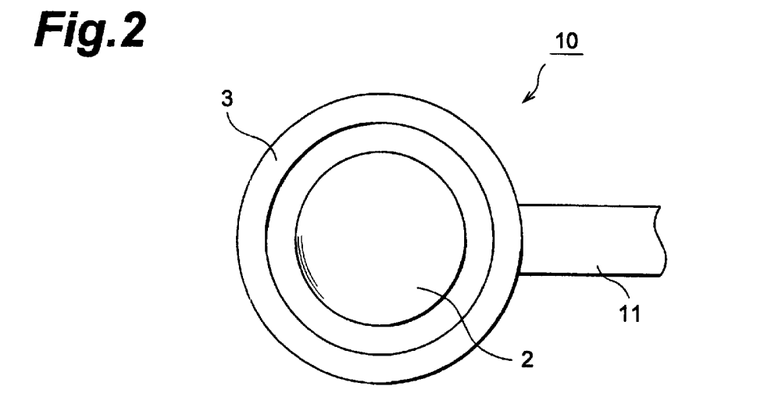
FIG. 2 is an explanatory view of a step of making the optical lens.
Figure 3:
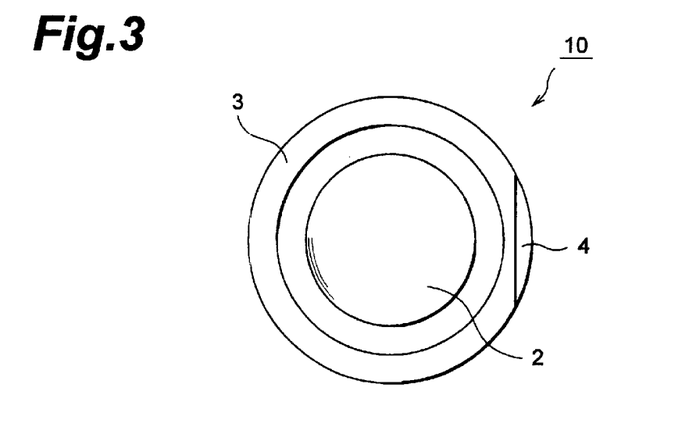
FIG. 3 is an explanatory view of a step of making the optical lens.
Figure 4:
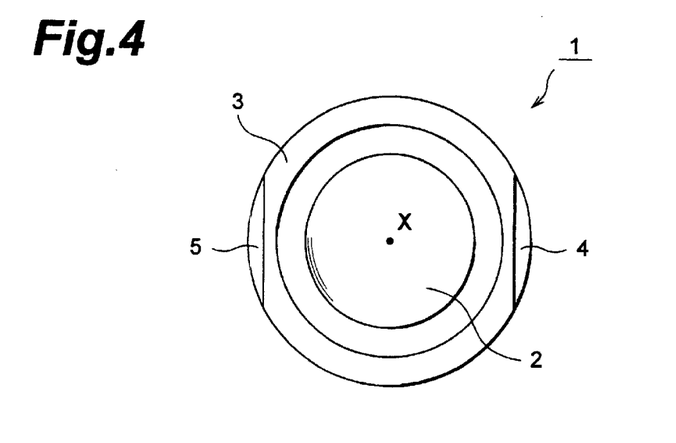
FIG. 4 is an explanatory view of a step of making the optical lens.

FIGS. 2 to 4 show explanatory views of the method of making the optical lens 1. For making the optical lens 1, first, as shown in FIG. 2, a lens molded article 10 whose flange 3 is provided with neither gate-cut section 4 nor center-of-gravity adjusting section 5 is formed by molding. For example, a mold having a cavity conforming to the outer shape of the lens molded article 10 is prepared, a molten resin is caused to flow into the cavity by way of a gate, and then the resin is solidified so as to mold the lens molded article 10. After molding, the lens molded article 10 is in a state where a gate portion 11 solidified within the gate of the mold is continuous with the outer periphery of the flange 3.

Then, as shown in FIG. 3, the gate portion 11 is cut off from the flange 3, so as to be removed from the lens molded article 10. The operation for cutting off the gate portion 11 is carried out by removing a part of the flange 3, for example, by cutting with an end mill. As the gate portion 11 is cut off, the gate-cut section 4 is formed in the flange 3 of the lens molded article 10.

Subsequently, as shown in FIG. 4, a part of the flange 3 is removed so as to position the center of gravity of the lens molded article 10 onto the optical axis X of the optically functioning portion 2. For example, at a position symmetrical to the gate-cut section 4 about the optical axis X, a part of the flange 3 is removed by cutting or the like. Here, the amount of removal is made similar to that upon forming the gate-cut section 4. Thus, as this part of the flange 3 is cut off, the center-of-gravity adjusting section 5 is formed. Forming the center-of-gravity adjusting section 5 completes the making of the optical lens 1. In such a method of making the optical lens 1, the gate-cut section 4 and the center-of-gravity adjusting section 5 may be formed at the same time.

Figure 5:
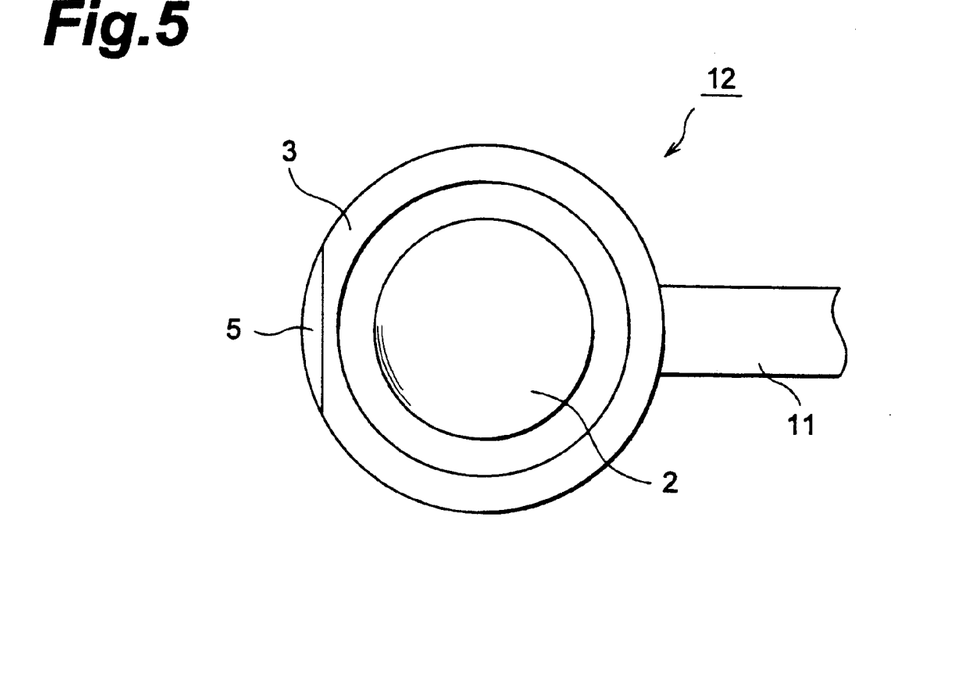
FIG. 5 is an explanatory view of a step of making the optical lens.

FIGS. 5 and 6 show explanatory views of another method of making the optical lens 1. As shown in FIG. 5, a lens molded article 12 whose flange 3 has already been provided with a center-of-gravity adjusting section 5 is formed by molding. For example, a mold having a cavity conforming to the outer shape of the lens molded article 12 is prepared, a molten resin is caused to flow into the cavity by way of a gate, and then the resin is solidified so as to mold the lens molded article 12. Here, the lens molded article 12 is in a state where a gate portion 11 solidified within the gate of the mold is continuous with the outer periphery of the flange 3, and the center-of-gravity adjusting section 5 is formed at a position symmetrical to the gate portion 11.

Figure 6:
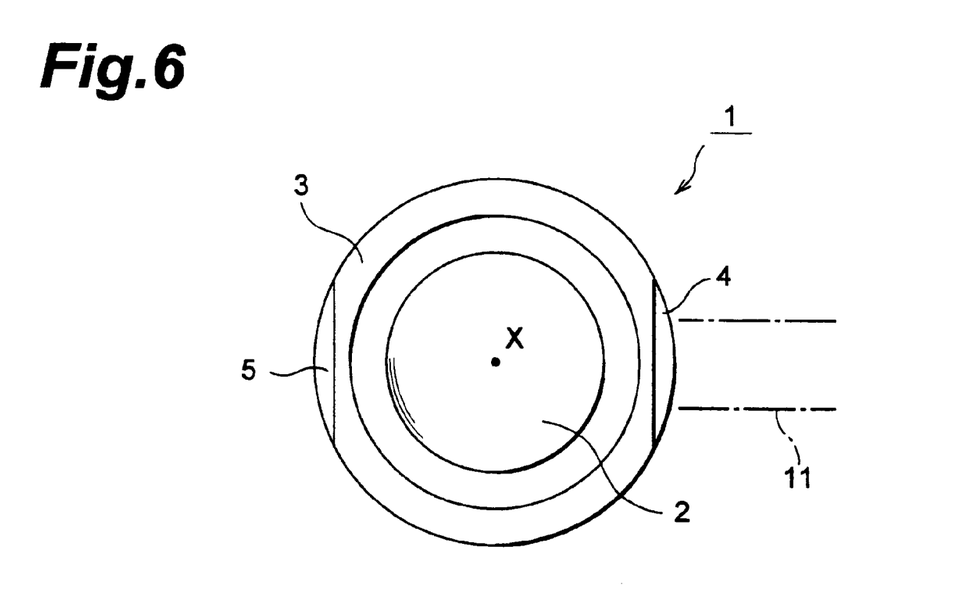
FIG. 6 is an explanatory view of a step of making the optical lens.

Then, as shown in FIG. 6, the gate portion 11 is cut off from the flange 3, so as to be removed from the lens molded article 12. The operation for cutting off the gate portion 11 is carried out by removing a part of the flange 3, for example, by cutting with an end mill. As the gate portion 11 is cut off, the gate-cut section 4 is formed in the flange 3 of the lens molded article 12. Here, it is important that the center of gravity of the lens be positioned on the optical axis X upon forming the gate-cut section 4. Removing the gate portion 11 and a part of the flange 3 completes the making of the optical lens 1. In this method of making the optical lens 1, the center-of-gravity adjusting section 5 can be formed simultaneously with molding, whereby it is unnecessary for this forming step to be carried out separately from the molding step. As a result, efficiency in manufacture can be improved.

Thus, in the optical lens 1 in accordance with this embodiment, as the center-of-gravity adjusting section 5 is provided, the center of gravity of the optical lens 1 can be positioned on its optical axis X even when the optical lens 1 has the gate-cut section 4. As a consequence, horizontal balance is easily acquired when the optical lens 1 is being mounted to a holder or the like. Also, when the optical lens 1 is employed as an objective lens of an optical pickup, balance in operation of an actuator for the objective lens can be easily adjusted, thus facilitating its handling.

Further, in the method of making the optical lens 1 in accordance with this embodiment, even when a part of the flange 3 is cut off in order to remove the gate portion 11, the center of gravity of the optical lens 1 can be positioned onto its optical axis X. As a consequence, horizontal balance is easily acquired when the optical lens 1 is being mounted to a holder or the like. Also, when the optical lens 1 is employed as an objective lens of an optical pickup, balance in operation of an actuator for the objective lens can be easily adjusted, thus facilitating its handling.

Second Embodiment

In the following, an optical lens and method of making the same in accordance with the second embodiment will be explained.

Figure 7:
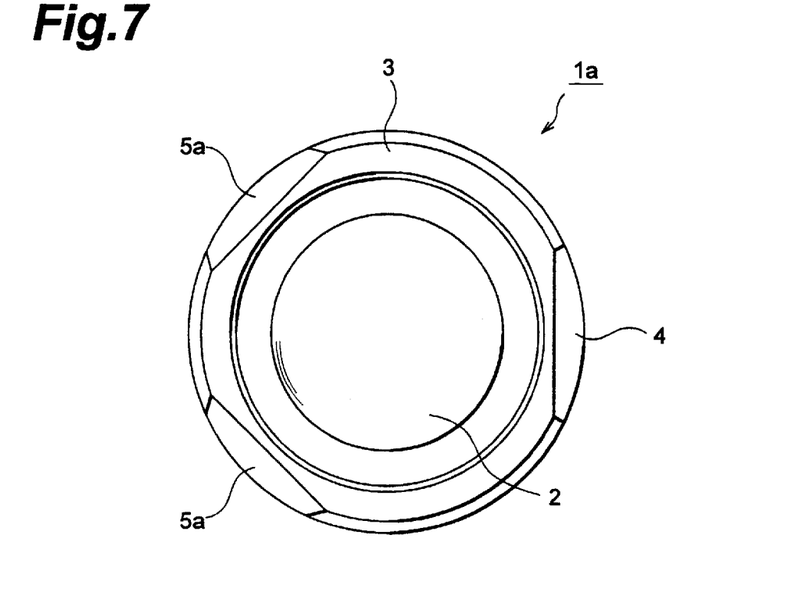
FIG. 7 is an explanatory view of an optical lens in accordance with a second embodiment.

FIG. 7 shows an optical lens 1a in accordance with this embodiment. In FIG. 7, as with the optical lens 1 of the first embodiment, the optical lens 1a is constituted by an optically functioning portion 2 and a flange 3 formed at the outer periphery thereof. A gate-cut section 4 is formed at an outer peripheral portion of the flange 3. The gate-cut section 4 is a cross section formed by removing a part of the outer peripheral portion of the flange 3 together with the gate portion formed upon molding.

Also, as shown in FIG. 7, center-of-gravity adjusting sections 5a, 5a are formed at the outer peripheral portion of the flange 3. A plurality of center-of-gravity adjusting sections 5a, each of which is a cross section formed by removing a part of the outer peripheral portion of the flange 3, are disposed in the flange 3. The center-of-gravity adjusting sections 5a are used for positioning the center of gravity of the lens, which shifts from the optical axis X due to the formation of the gate-cut section 4, onto the optical axis X. Though two center-of-gravity adjusting sections 5a are formed in the flange 3 in FIG. 7, three or more may be formed as long as the center of gravity of the lens can be positioned on the optical axis X thereby.

The optical lens 1a can be made in a manner similar to that of the above-mentioned optical lens 1.

As explained in the foregoing, in the optical lens 1a and method of making the optical lens 1a in accordance with this embodiment, like the optical lens 1 in accordance with the first embodiment, as the center-of-gravity adjusting sections 5a are provided, the center of gravity of the optical lens 1a can be positioned on its optical axis X even when the optical lens 1a has the gate-cut section 4. As a consequence, horizontal balance is easily acquired when the optical lens 1a is being mounted to a holder or the like. Also, when the optical lens 1a is employed as an objective lens of an optical pickup, balance in operation of an actuator for the objective lens can be easily adjusted, thus facilitating its handling.

Third Embodiment

In the following, an optical lens and method of making the same in accordance with the third embodiment will be explained.

Figure 8:
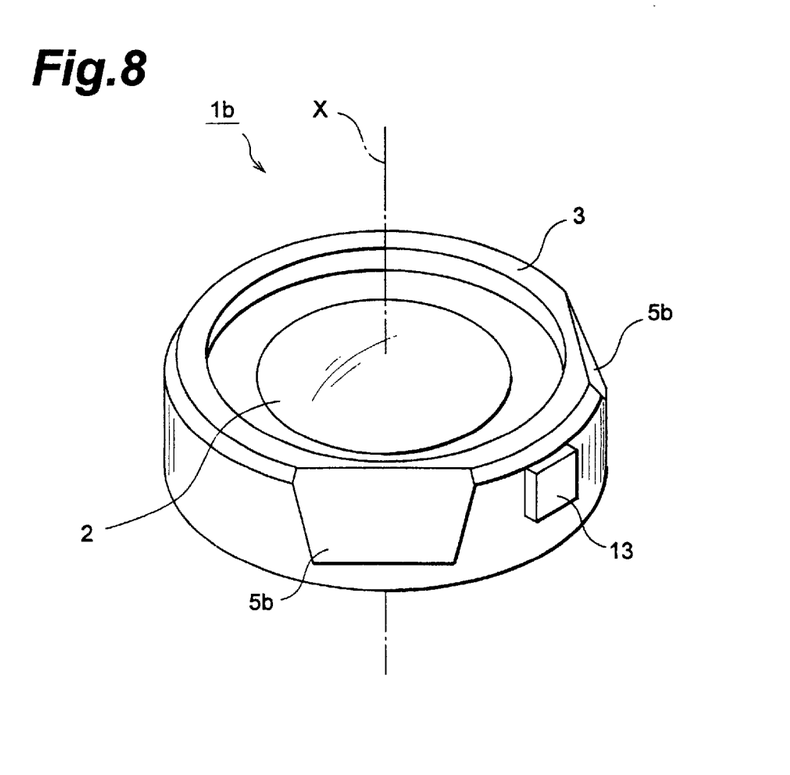
FIG. 8 is an explanatory view of an optical lens in accordance with a third embodiment.

FIG. 8 shows an optical lens 1b in accordance with this embodiment. In FIG. 8, as with above-mentioned optical lenses 1 and 1a, the optical lens 1b is constituted by an optically functioning portion 2 and a flange 3 formed at the outer periphery thereof. A cutoff section 13 is formed at an outer peripheral portion of the flange 3. The cutoff section 13, which is left when a gate portion 11 formed upon molding is cut off, projects from the outer periphery of the flange 3.

Also, as shown in FIG. 8, center-of-gravity adjusting sections 5b, 5b are formed at the outer peripheral portion of the flange 3. A plurality of center-of-gravity adjusting sections 5b, each of which is a cross section formed by removing a part of the outer peripheral portion of the flange 3, are disposed in the flange 3. The center-of-gravity adjusting sections 5b are used for positioning the center of gravity of the lens, which shifts from the optical axis X due to the formation of the cutoff section 13, onto the optical axis X. Though two center-of-gravity adjusting sections 5b are formed in the flange 3 in FIG. 8, three or more may be formed as long as the center of gravity of the lens 1b can be positioned on the optical axis X thereby.

A method of making the optical lens 1b will now be explained.

Figure 9:
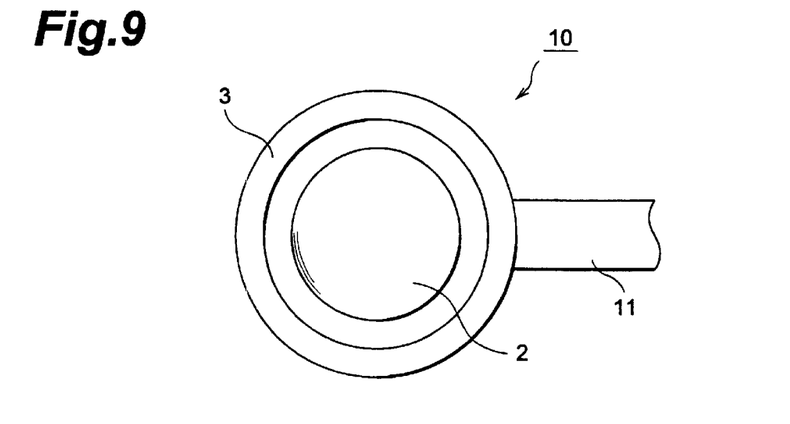
FIG. 9 is an explanatory view of the optical lens in accordance with the third embodiment.
Figure 10:
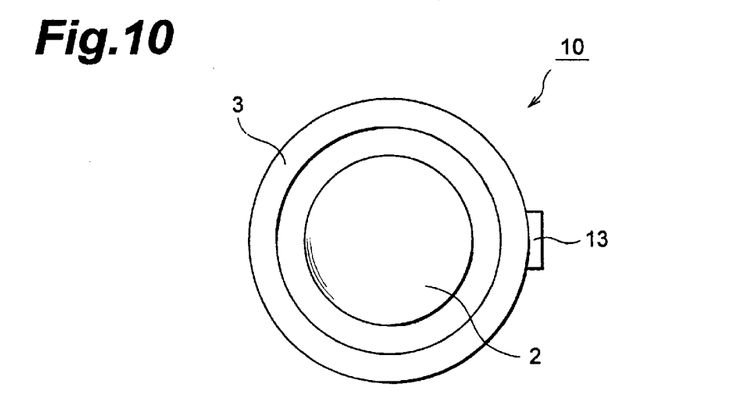
FIG. 10 is an explanatory view of the optical lens in accordance with the third embodiment.
Figure 11:
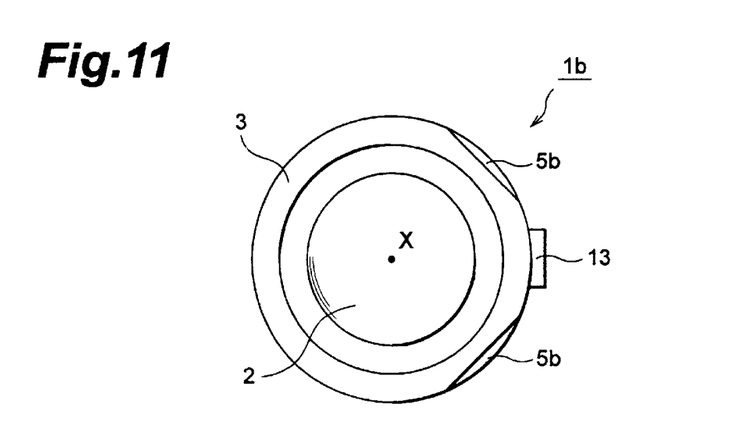
FIG. 11 is an explanatory view of the optical lens in accordance with the third embodiment.

FIGS. 9 to 11 show explanatory views of the method of making the optical lens 1b. For making the optical lens 1b, first, as shown in FIG. 9, a lens molded article 10 whose flange 3 is provided with neither cutoff section 13 nor center-of-gravity adjusting section 5 is formed by molding. For example, a mold having a cavity conforming to the outer shape of the lens molded article 10 is prepared, a molten resin is caused to flow into the cavity by way of a gate, and then the resin is solidified so as to mold the lens molded article 10. Here, the lens molded article 10 is in a state where the gate portion 11 solidified within the gate of the mold is continuous with the outer periphery of the flange 3.

Then, as shown in FIG. 10, the gate portion 11 is cut off leaving a part thereof. The operation for cutting off the gate portion 11 is carried out by cutting with an end mill, for example. As the gate portion 11 is cut off, the cutoff section 13 projects from the flange 3 of the lens molded article 10.

Subsequently, as shown in FIG. 11, the flange 3 is partly removed such as to position the center of gravity of the lens molded article 10 onto the optical axis X of the optically functioning portion 2. In order for the center of gravity to be positioned on the optical axis X of the optically functioning portion 2, the removing areas of the flange 3 are located on the cutoff section 13 side (right side in FIG. 11) of the optical axis X. Also, the removing areas of the flange 3 are determined in view of the amount of removal such that the center of gravity of the lens after removal is placed on the optical axis X of the optically functioning portion 2. As the flange 3 is thus partly removed, the center-of-gravity adjusting sections 5b, 5b are formed. Forming of the center-of-gravity adjusting sections 5b completes the making of the optical lens 1b.

Figure 12:
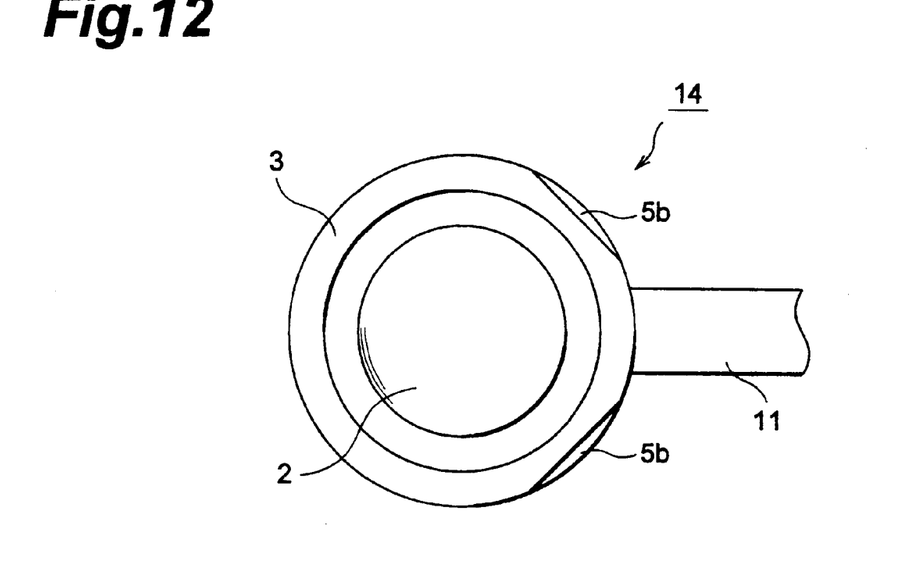
FIG. 12 is an explanatory view of the optical lens in accordance with the third embodiment.

FIGS. 12 and 13 show explanatory views of another method of making the optical lens 1b. As shown in FIG. 12, a lens molded article 14 whose flange 3 has already been provided with center-of-gravity adjusting sections 5b, 5b is formed by molding. For example, a mold having a cavity conforming to the outer shape of the lens molded article 14 is prepared, a molten resin is caused to flow into the cavity by way of a gate, and then the resin is solidified so as to mold the lens molded article 14. After molding, the lens molded article 14 is in a state where a gate portion 11 solidified within the gate of the mold is continuous with the outer periphery of the flange 3.

Figure 13:
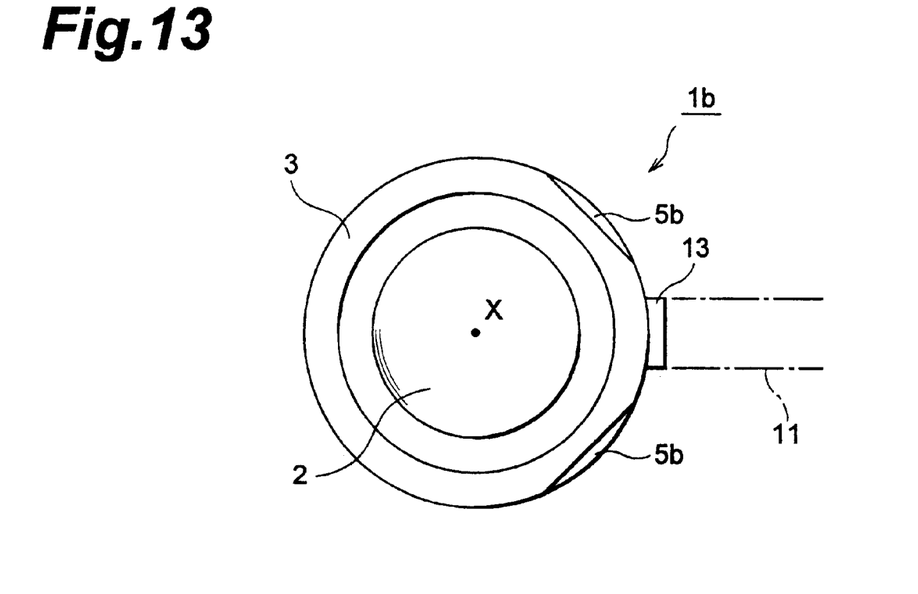
FIG. 13 is an explanatory view of the optical lens in accordance with the third embodiment.

Then, as shown in FIG. 13, the gate portion 11 is cut off. The operation for cutting off the gate portion 11 is carried out by cutting with an end mill, for example. As the gate portion 11 is cut off, the cutoff section 13 is formed at the flange 3 of the lens molded article 14. Here, it is important that the center of gravity of the lens be positioned on the optical axis X upon forming the cutoff section 13. Namely, taking account of the amount of recession of the center-of-gravity adjusting sections 5b, 5b recessed in the flange 3, the cutting position of the gate portion 11 is determined, and the gate portion 11 is cut off. Cutting the gate portion 11 completes the making of the optical lens 1b. In this method of making the optical lens 1b, the center-of-gravity adjusting sections 5b can be formed simultaneously with molding, whereby it is unnecessary for this forming step to be carried out separately from the molding step. As a result, efficiency in manufacture can be improved.

Thus, in the optical lens 1b and method of making the optical lens 1b in accordance with this embodiment, as the center-of-gravity adjusting sections 5b are provided, the center of gravity of the optical lens 1b can be positioned on its optical axis X even when the optical lens 1b has the cutoff section 13. As a consequence, horizontal balance is easily acquired when the optical lens 1b is being mounted to a holder or the like. Also, when the optical lens 1b is employed as an objective lens of an optical pickup, balance in operation of an actuator for the objective lens can be easily adjusted, thus facilitating its handling. ps Fourth Embodiment In the following, an optical lens and method of making the same in accordance with the fourth embodiment will be explained.

Figure 14:
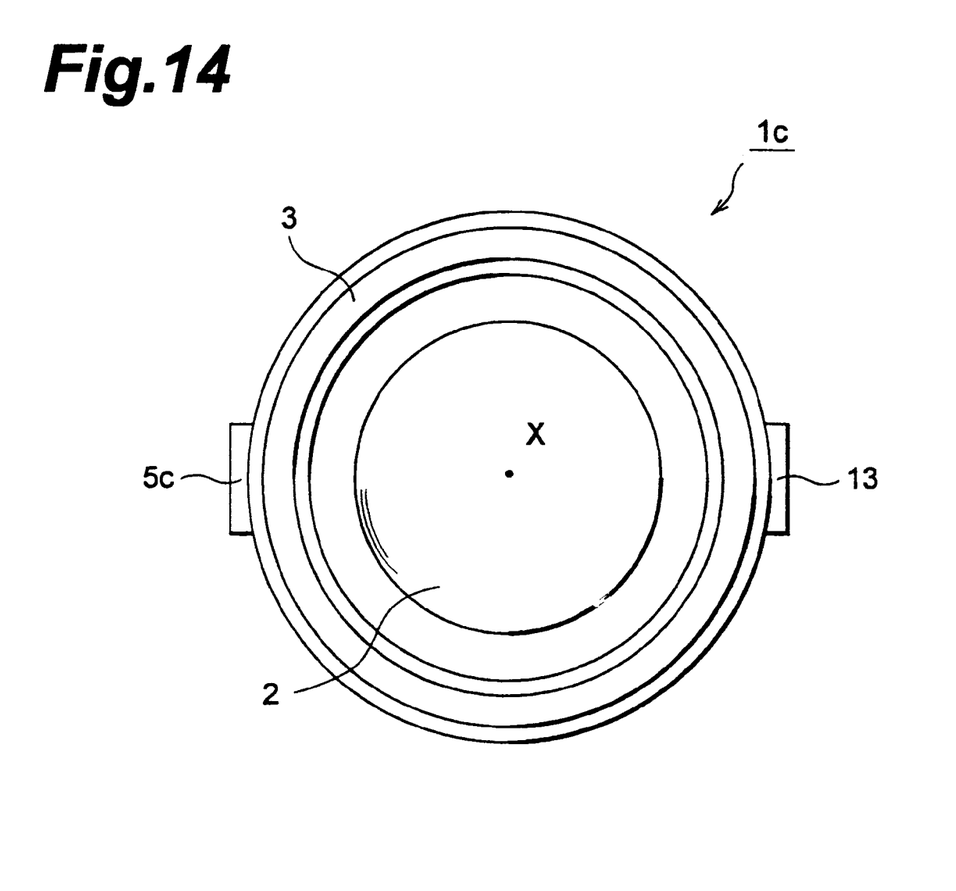
FIG. 14 is an explanatory view of an optical lens in accordance with a fourth embodiment.

FIG. 14 shows an optical lens 1c in accordance with this embodiment. In FIG. 14, as with above-mentioned optical lens 1 and so forth, the optical lens 1c is constituted by an optically functioning portion 2 and a flange 3 formed at the outer periphery thereof. A cutoff section 13 is formed at an outer peripheral portion of the flange 3. The cutoff section 13, which is left when a gate portion 11 formed upon molding is cut off, projects from the outer periphery of the flange 3.

Also, as shown in FIG. 14, a center-of-gravity adjusting section 5c is formed at the outer peripheral portion of the flange 3. The center-of-gravity adjusting section 5c, which is a protrusion projecting from the outer periphery of the flange 3, is used for positioning the center of gravity of the lens, which shifts from the optical axis X due to the formation of the cutoff section 13, onto the optical axis X. Though one center-of-gravity adjusting section 5c is formed at the flange 3 in FIG. 14, two or more may be formed as long as the center of gravity of the lens 1c can be positioned on the optical axis X thereby.

A method of making the optical lens 1c will now be explained.

Figure 15:
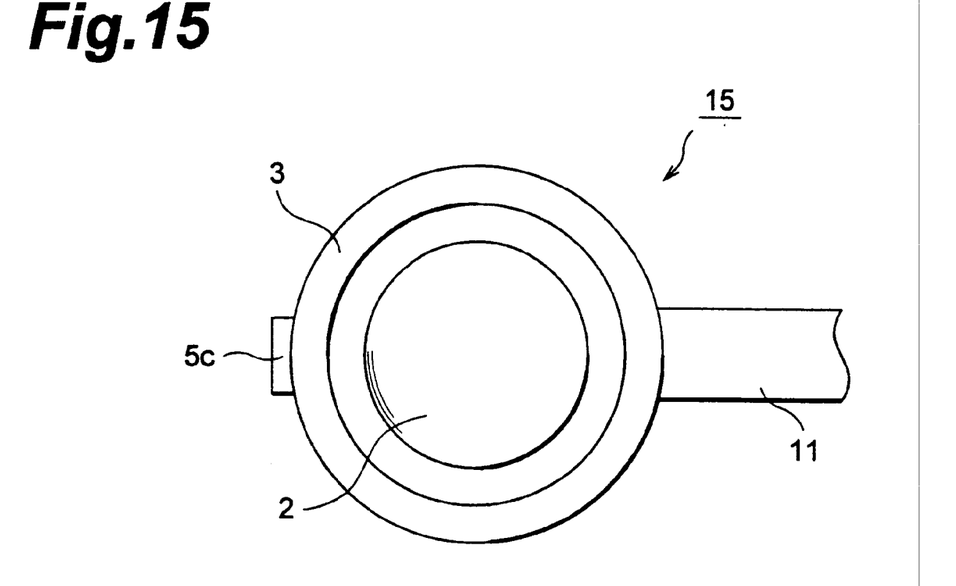
FIG. 15 is an explanatory view of the optical lens in accordance with the fourth embodiment.

FIGS. 15 and 16 show explanatory views of a method of making the optical lens 1c. As shown in FIG. 15, a lens molded article 15 whose flange 3 has already been provided with a center-of-gravity adjusting section 5c is formed by molding. For example, a mold having a cavity conforming to the outer shape of the lens molded article 15 is prepared, a molten resin is caused to flow into the cavity by way of a gate, and then the resin is solidified so as to mold the lens molded article 15. After molding, the lens molded article 15 is in a state where a gate portion 11 solidified within the gate of the mold is continuous with the outer periphery of the flange 3.

Figure 16:
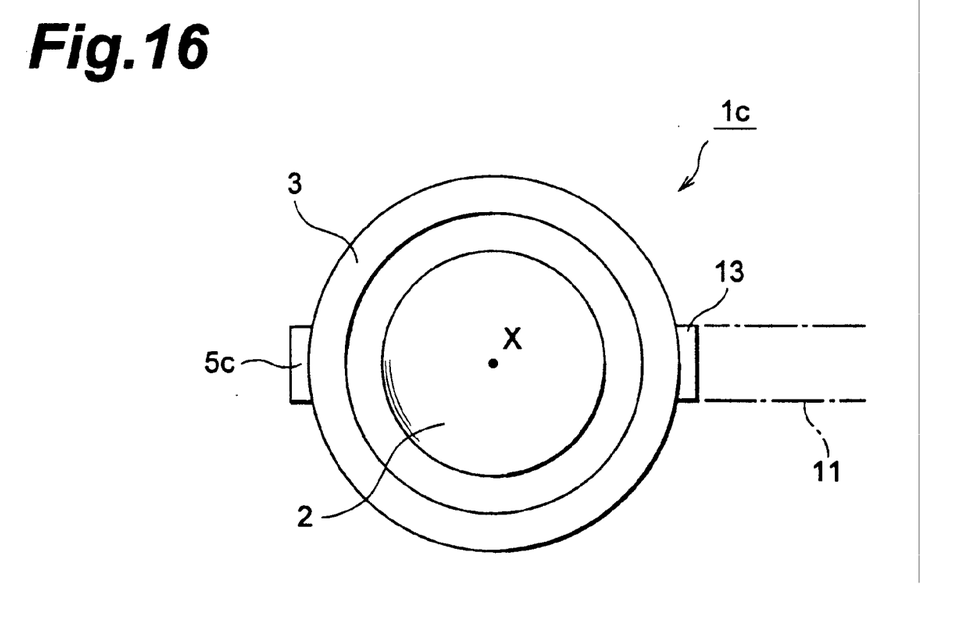
FIG. 16 is an explanatory view of the optical lens in accordance with the fourth embodiment.

Then, as shown in FIG. 16, the gate portion 11 is cut off. The operation for cutting off the gate portion 11 is carried out by cutting with an end mill, for example. As the gate portion 11 is cut off, the cutoff section 13 is formed at the flange 3 of the lens molded article 15. Here, it is important that the center of gravity of the lens be positioned on the optical axis X upon forming the cutoff section 13. Namely, taking account of the amount of projection of the center-of-gravity adjusting section 5c, the cutting position of the gate portion 11 is determined, and the gate portion 1 is cut off. Cutting the gate portion 11 completes the making of the optical lens 1c. In this method of making the optical lens 1c, the center-of-gravity adjusting sections 5c can be formed simultaneously with molding, whereby it is unnecessary for this forming step to be carried out separately from the molding step. As a result, efficiency in manufacture can be improved.

Thus, in the optical lens 1c and method of making the optical lens 1c in accordance with this embodiment, as the center-of-gravity adjusting section 5c is provided, the center of gravity of the optical lens 1c can be positioned on its optical axis X even when the optical lens 1c has the cutoff section 13 of the gate portion 11. As a consequence, horizontal balance is easily acquired when the optical lens 1c is being mounted to a holder or the like. Also, when the optical lens 1c is employed as an objective lens of an optical pickup, balance in operation of an actuator for the objective lens can be easily adjusted, thus facilitating its handling.

As explained in the foregoing, the present invention can yield the following effects.

Namely, as the flange is provided with a center-of-gravity adjusting section, the center of gravity of the lens can be positioned onto its optical axis even when the flange is formed with a gate-cut section. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

Further, as the flange is provided with a center-of-gravity adjusting section, the center of gravity of the lens can be positioned onto its optical axis even when the flange is formed with a cutoff section of a gate. As a consequence, horizontal balance is easily acquired when the optical lens is being mounted to a holder or the like. Also, when the optical lens is employed as an objective lens of an optical pickup, balance in operation of an actuator for the objective lens can be easily adjusted, thus facilitating its handling.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical lens including:

an optically functioning portion; and a flange at an outer periphery of the optically functioning portion said flange including a gate-cut section where a part of said flange and a gate portion have been removed; and a center-of-gravity adjusting section positioning a center of gravity of said optical lens in alignment with an optical axis of said optically functioning portion.

2. An optical lens including:

a flange at an outer periphery of an optically functioning portion;

a cutoff section where a gate portion continuous with said flange has been removed; and a center-of-gravity adjusting section on said flange, said center-of-gravity adjusting section positioning a center of gravity of said optical lens in alignment with an optical axis of said optically functioning portion.

3. An optical lens including:

a flange at an outer periphery of an optically functioning portion;

a cutoff section where a gate portion continuous with said flange has been removed; and a center-of-gravity adjusting section projecting from said flange, said center-of-gravity adjusting section positioning a center of gravity of said optical lens in alignment with an optical axis of said optically functioning portion.

4. A method of making an optical lens comprising:

molding a lens molded article including an optically functioning portion, a flange at the outer periphery of said optically functioning portion, and a gate portion projecting from said flange;

cutting off a part of said flange together with said gate portion; and removing a part of said flange to position a center of gravity of said optical lens in alignment with an optical axis of said optically functioning portion.

5. A method of making an optical lens comprising:

molding a lens molded article including an optically functioning portion, a flange at the outer periphery of said optically functioning portion, and a gate portion projecting from said flange wherein a part of an outer edge of said flange is removed to form a center-of-gravity adjusting section; and removing a part of said flange together with said gate portion to position a center of gravity of said optical lens in alignment with an optical axis of said optically functioning portion.

6. A method of making an optical lens comprising:

molding a lens molded article including an optically functioning portion, a flange at the outer periphery of said optically functioning portion, and a gate portion projecting from said flange;

cutting off said gate portion leaving a part of said gate portion; and removing a part of said flange to position a center of gravity of said optical lens in alignment with an optical axis of said optically functioning portion.

7. A method of making an optical lens comprising:

molding a lens molded article including an optically functioning portion, a flange at the outer periphery of said optically functioning portion, and a gate portion projecting from said flange wherein a part of an outer edge of said flange is removed to form a center-of-gravity adjusting section; and cutting off a portion of said gate portion to position a center of gravity of the optical lens in alignment with an optical axis of said optically functioning portion.

8. A method of making an optical lens comprising:

molding a lens molded article including an optically functioning portion, a flange at the outer periphery of said optically functioning portion, and a gate portion projecting from said flange, and a center-of-gravity adjusting section projecting from said flange at a position symmetrical to said gate portion; and cutting off a portion of said gate portion to position a center of gravity of said optical lens in alignment with an optical axis of said optically functioning portion.

9. An optical lens including:

an optically functioning portion having an optical axis and an outer a periphery;

a flange disposed around the outer periphery of the optically functioning portion and having a center of gravity not coincident with the optical axis of the optical functioning portion; and a center-of-gravity adjusting section positioning the center of gravity of the optical lens in the optical axis of the optically functioning portion.

10. The optical lens of claim 9, wherein the flange comprises a gate-cut section.

11. The optical lens of claim 9, wherein the flange comprises a cutoff section.

12. The optical lens of claim 9, wherein the center-of-gravity adjusting section comprises at least one asymmetrical segment of the flange.

13. The optical lens of claim 9, wherein the center-of-gravity adjusting section comprises at least one segment projecting from the flange.

* * * * *